United States Patent
Furuto

(10) Patent No.: US 9,997,905 B2
(45) Date of Patent: *Jun. 12, 2018

(54) CONTROL DEVICE

(71) Applicants: AutoNetworks Technologies, Ltd., Yokkaichi, Mie (JP); Sumitomo Wiring Systems, Ltd., Yokkaichi, Mie (JP); Sumitomo Electric Industries, Ltd., Osaka-shi, Osaka (JP)

(72) Inventor: Ken Furuto, Mie (JP)

(73) Assignees: AutoNetworks Technologies, Ltd., Yokkaichi, Mie (JP); Sumitomo Wiring Systems, Ltd., Yokkaichi, Mie (JP); SUMITOMO ELECTRIC INDUSTRIES, LTD., Osaka-shi, Osaka (JP)

( * ) Notice: Subject to any disclaimer, the term of this patent is extended or adjusted under 35 U.S.C. 154(b) by 236 days.

This patent is subject to a terminal disclaimer.

(21) Appl. No.: 14/916,519

(22) PCT Filed: Aug. 19, 2014

(86) PCT No.: PCT/JP2014/071604
§ 371 (c)(1),
(2) Date: Jun. 17, 2016

(87) PCT Pub. No.: WO2015/033765
PCT Pub. Date: Mar. 12, 2015

(65) Prior Publication Data
US 2016/0315464 A1 Oct. 27, 2016

(30) Foreign Application Priority Data

Sep. 5, 2013 (JP) ................................. 2013-184155

(51) Int. Cl.
*H02H 7/00* (2006.01)
*H02H 7/26* (2006.01)
(Continued)

(52) U.S. Cl.
CPC .............. *H02H 7/268* (2013.01); *H02H 3/05* (2013.01); *H02H 5/04* (2013.01)

(58) Field of Classification Search
CPC .................................................... H02H 7/268
See application file for complete search history.

(56) References Cited

U.S. PATENT DOCUMENTS 8,405,946 B2    3/2013  Higuchi
8,437,110 B2 *  5/2013  Nakamura ............... H02H 6/00
                                                          361/101

(Continued)

FOREIGN PATENT DOCUMENTS

JP    2009130944 A    6/2009
JP    2012124982 A    6/2012

OTHER PUBLICATIONS

International Search Report and Written Opinion for Application No. PCT/JP2014/071604 dated Sep. 22, 2014, 7 pages.

(Continued)

*Primary Examiner* — Stephen W Jackson
(74) *Attorney, Agent, or Firm* — Reising Ethington, P.C.

(57) ABSTRACT

A control device that can realize low power consumption even if the temperature of a wire is erroneously calculated. A control unit calculates, for each of one or more wires, a temperature difference between an ambient temperature of the wire and a temperature of the wire over time, and supplies/interrupts an electric current that flows through the wire. The control unit interrupts, for each of the wires, the electric current if the temperature sum of the calculated temperature difference and the ambient temperature is (Continued)

greater than or equal to a first threshold. The control unit measures a time period in which the electric current is being interrupted. If, for each of the wires the calculated temperature difference is less than a second threshold or the measure time period exceeds a predetermined time period, the control unit halts the calculation of the temperature of the wires.

3 Claims, 8 Drawing Sheets

(51) Int. Cl.
  *H02H 5/04* (2006.01)
  *H02H 3/05* (2006.01)

(56) References Cited

U.S. PATENT DOCUMENTS

| | | |
|---|---|---|
| 8,767,367 B2 | 7/2014 | Higuchi |
| 8,918,222 B2 * | 12/2014 | Higuchi ................ H02J 7/0031 |
| | | 323/284 |
| 2013/0250463 A1 | 9/2013 | Ueta |

OTHER PUBLICATIONS

English Translation of International Search Report for Application No. PCT/JP2014/071604 dated Sep. 22, 2014, 2 pages.

* cited by examiner

CONTROL DEVICE

CROSS REFERENCE TO RELATED APPLICATIONS

This application claims the priority of Japanese patent application JP2013-184155 filed on Sep. 5, 2013, the entire contents of which are incorporated herein.

TECHNICAL FIELD

The present invention relates to a control device for supplying/interrupting an electric current that flows through a wire and calculating the temperature of the wire, the control device interrupting the electric current flowing through the wire if the calculated temperature is greater than or equal to a threshold.

BACKGROUND ART

Recently, a control device has been proposed that supplies/interrupts an electric current that flows through a wire connected between a battery and a load by turning on/off a switch that is provided at an intermediate position of the wire. The wire generates Joule heat when an electric current flows through the wire. Even when no over current flows through the wire, the Joule heat may possibly exceed the heat radiation amount of the wire. If the Joule heat exceeds the heat radiation amount of the wire, the temperature of the wire will increase in the course of time in which the electric current flows through the wire, and smoke will be generated when the temperature of the wire exceeds a predetermined temperature.

Conventional control devices for supplying/interrupting an electric current that flows through a wire encompass a control device (see Patent Document 1, for example) for calculating a temperature of a wire and interrupting an electric current flowing through the wire if the calculated temperature exceeds a predetermined temperature, in order to prevent smoke generation of the wire.

The control device disclosed in Patent Document 1 detects the electric current flowing through the wire in a predetermined first cycle, and calculates the temperature of the wire based on the detected current value. The control device disclosed in Patent Document 1 interrupts the electric current flowing through the wire if the calculated temperature of the wire exceeds a predetermined first temperature that is close to the smoke generation temperature. Accordingly, smoke generation of the wire is prevented.

Furthermore, if the calculated temperature of the wire is lower than a predetermined second temperature that is lower than the first temperature and is close to the ambient temperature of the wire, the control device disclosed in Patent Document 1 detects the electric current flowing through the wire in a predetermined second cycle that is longer than the first cycle, and calculates the temperature of the wire based on the detected current value. Accordingly, the control device disclosed in Patent Document 1 reduces the number of times of the calculation of the wire temperature if the temperature of the wire is lower than the second temperature, realizing low power consumption.

CITATION LIST

Patent Document

Patent Document 1: JP 2012-124982A

SUMMARY OF INVENTION

Technical Problem

However, in the control device disclosed in Patent Document 1, there is a risk that the temperature of the wire is erroneously calculated if a program for use in the calculation of the temperature of the wire has a so-called bug such as a defect or an error or if a calculator for calculating the temperature of the wire malfunctions. In this case, the calculated temperature of the wire does not become lower than the second temperature although the actual temperature of the wire is lower than the second temperature, and thus the number of times of calculation of the wire temperature may be not reduced.

Since the number of times of calculation of the wire temperature will not be reduced if the calculated temperature of the wire is not lower than the second temperature, the control device disclosed in Patent Document 1 thus has the problem that realization of low power consumption is not possible.

The present invention was made in view of the above-described circumstance, and it is a potential object thereof to provide a control device that can realize low power consumption even if the temperature of a wire is erroneously calculated.

Solution to Problem

A control device according to an embodiment includes: calculation means for calculating, over time, a temperature difference between an ambient temperature of a wire and a temperature of the wire, the control device being for supplying/interrupting an electric current that flows through the wire, and interrupting the electric current if a temperature sum of the temperature difference calculated by the calculation means and the ambient temperature is greater than or equal to a first threshold, the control device further including: time measuring means for measuring a time period in which the electric current is being interrupted; and halting means for halting the calculation of the calculation means if the temperature difference calculated by the calculation means is less than a second threshold, or if the time period measured by the time measuring means exceeds a predetermined time period.

According to an embodiment, an electric current that flows through a wire is supplied/interrupted, and a temperature difference between the ambient temperature of the wire and the temperature of the wire is calculated over time, and if the temperature sum of the calculated temperature difference and the ambient temperature of the wire is greater than or equal to the first threshold, for example, 145° C., the electric current is interrupted. Furthermore, a time period in which the electric current is being interrupted is measured. Furthermore, if the calculated temperature difference, that is, the temperature difference between the temperature of the wire and the ambient temperature of the wire is less than the second threshold, for example, 5° C., or the measured time period exceeds the predetermined time period, the calculation of the temperature difference is halted.

Therefore, even if due to a bug of a program for use in the calculation of the temperature difference, malfunction of a calculator for calculating the temperature difference, or the like, a temperature difference is erroneously calculated and the calculated temperature difference is not less than the second threshold, the calculation of the temperature difference is halted when the time period in which the electric current flowing through the wire is being interrupted exceeds the predetermined time period, realizing low power consumption.

The control device according to an embodiment includes: detection means for detecting the electric current flowing through the wire, wherein the calculation means is configured to calculate the temperature difference using a value of the electric current detected by the detection means and a previously calculated temperature difference.

According to an embodiment, the electric current flowing through the wire is detected, and a temperature difference between the ambient temperature of the wire and the temperature of the wire is calculated using the detected current value and a previously calculated temperature difference. Therefore, the temperature difference is easily and accurately calculated.

A control device may include: calculation means for calculating over time, for each of a plurality of wires, a temperature difference between an ambient temperature of the wire and a temperature of the wire, the control device being for supplying/interrupting an electric current that flows through each of the plurality of wires, and interrupting, if a temperature sum of the temperature difference calculated by the calculation means and the ambient temperature is greater than or equal to a first threshold, the electric current flowing through that wire of the plurality of wires where the temperature sum is greater than or equal to the first threshold, the control device further including: time measuring means for measuring, for each of the plurality of wires, a time period in which an electric current flowing through the wire is being interrupted; and halting means for halting the calculation by the calculation means if, for each of the plurality of wires, the temperature difference calculated by the calculation means is less than a second threshold or the time period measured by the time measuring means exceeds a predetermined time period.

According to an embodiment, for each of a plurality of wires, an electric current that flows through the wire is supplied/interrupted, and the temperature difference between the ambient temperature of the wire and the temperature of the wire is calculated over time. If, for each of the plurality of wires, the temperature sum of the calculated temperature difference and the ambient temperature of the wire is greater than or equal to the first threshold, for example, 145° C., the electric current will be interrupted. Furthermore, for each of the plurality of wires, a time period in which the electric current is being interrupted is measured. If, for each of the plurality of wires, the calculated temperature difference is less than the second threshold, for example, 5° C., or the measure time period exceeds the predetermined time period, the calculation of the temperature difference will be halted.

Therefore, even if due to a bug of a program for calculating the temperature difference, malfunction of a calculator for calculating the temperature difference, or the like, a temperature difference with respect to, for example, one of the plurality of wires is erroneously calculated and the calculated temperature difference is less than the second threshold, it is possible to halt the calculation of the temperature difference, realizing low power consumption.

Advantageous Effects

According to one aspect, a time period in which an electric current is being interrupted is measured, and if the measured time period exceeds a predetermined time period, it is possible to halt calculation of a temperature difference, making it possible to realize low power consumption even if the wire temperature is erroneously calculated.

DESCRIPTION OF EMBODIMENTS

Hereinafter, the present invention will be described in detail with reference to the drawings illustrating embodiments thereof.

Figure 1:
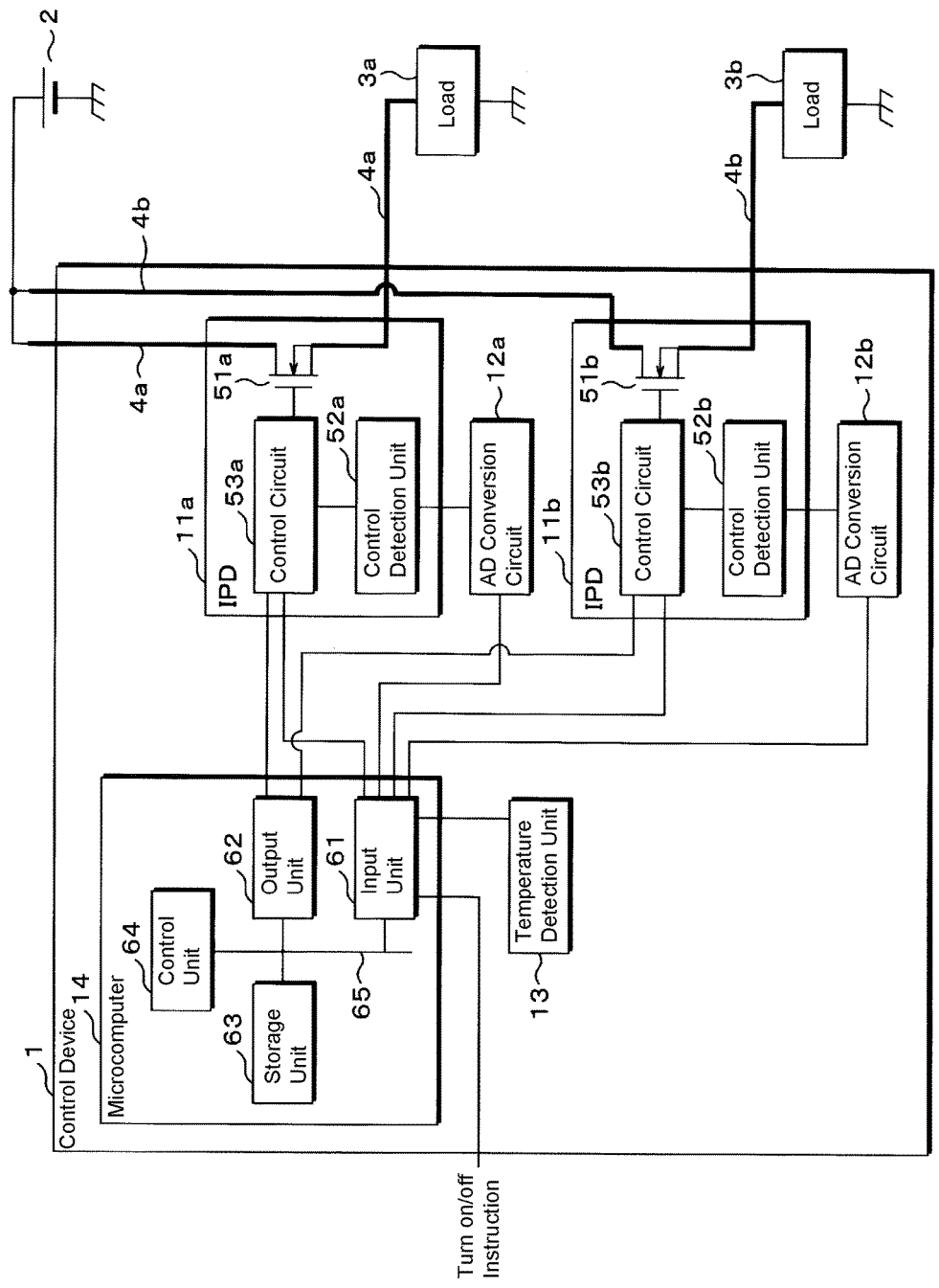
FIG. 1 is a block diagram illustrating a configuration of the main part of a control device according to an aspect of the present invention.

FIG. 1 is a block diagram illustrating a configuration of the main part of a control device according to an embodiment of the present invention. This control device 1 is suitably installed in a vehicle, is connected to a positive terminal of a battery 2 and one end of a load 3a via a wire 4a, and is connected to the positive terminal of the battery 2 and an end of the load 3b via a wire 4b. A negative terminal of the battery 2 and the other ends of the loads 3a and 3b are grounded.

The control device 1 receives turn on/off instructions to turn on or off the respective loads 3a and 3b from the outside, and supplies or interrupts electric currents that flow through the respective wires 4a and 4b based on the contents of the received turn on/off instructions. Furthermore, the control device 1 detects the ambient temperature of the respective wires 4a and 4b, and electric currents flowing through the respective wires 4a and 4b, and calculates the temperatures of the respective wires 4a and 4b based on the detected ambient temperature and the current values.

With respect to the wire 4a (or the wire 4b), the control device 1 interrupts the electric current through the wire 4a (or the wire 4b) based on the detected current value, the calculated temperature of the wire 4a (or the wire 4b), or the like, regardless of the content of the turn on/off instruction received from the outside.

The loads 3a and 3b are each electric equipment such as a head light or a wiper. When the control device 1 supplies an electric current that flows through the wire 4a, the load 3a is turned on by being powered by the battery 2, and when the control device 1 interrupts the electric current that flows through the wire 4a, the load 3a is turned off by being not powered by the battery 2. Similar to the load 3a, the load 3b is also turned on by being powered when the control device 1 supplies an electric current that flows through the wire 4b, and is turned off by being not powered when the control device 1 interrupts the electric current that flows through the wire 4b.

The control device 1 includes IPDs (Intelligent Power Device) 11a and 11b, AD (Analog/Digital) conversion circuits 12a and 12b, a temperature detection unit 13, and a microcomputer 14. The IPD 11a is connected between the positive terminal of the battery 2 and one end of the load 3a via the wire 4a, and the IPD 11b is connected between the positive terminal of the battery 2 and one end of the load 3b via the wire 4b. The IPDs 11a and 11b are respectively connected to the AD conversion circuits 12a and 12b. Furthermore, the IPDs 11a and 11b and the AD conversion circuits 12a and 12b are separately connected to the microcomputer 14. The microcomputer 14 is also connected to the temperature detection unit 13.

The IPD 11a has an N-channel-type FET (Field Effect Transistor) 51a, a current detection unit 52a, and a control circuit 53a. A drain of the FET 51a is connected to the positive terminal of the battery 2 via the wire 4a, a source of the FET 51a is connected to the one end of the load 3a via the wire 4a, and a gate of the FET 51a is connected to the control circuit 53a. The control circuit 53a is connected to, in addition to the gate of the FET 51a, the current detection unit 52a and the microcomputer 14. The current detection unit 52a is further connected to the AD conversion circuit 12a.

The FET 51a functions as a switch. The FET 51a is turned on when a voltage having a predetermined magnitude or more is applied to the gate, and an electric current flows from the drain of the FET 51a to the source thereof. Furthermore, the FET 51a is turned off when a voltage applied to the gate has a magnitude less than the predetermined magnitude, and no electric current flows from the drain of the FET 51a to the source thereof. The voltage applied to the gate of the FET 51a is adjusted by the control circuit 53a, and the FET 51a is turned on/off by the control circuit 53a.

The current detection unit 52a detects the electric current flowing through the wire 4a, and outputs analog current value data indicating the detected current value to the control circuit 53a and the AD conversion circuit 12a.

A turn off instruction to interrupt the electric current that flows through the wire 4a or a supply instruction to supply the electric current that flows through the wire 4a is input to the control circuit 53a from the microcomputer 14. When the supply instruction is input from the microcomputer 14, the control circuit 53a switches on the FET 51a, supplies the electric current that flows through the wire 4a, and turns on the load 3a.

Furthermore, when the turn off instruction is input from the microcomputer 14, the control circuit 53a switches off the FET 51a, interrupts the electric current that flows through the wire 4a, and turns off the load 3a.

Furthermore, if the current value indicated by the current value data input from the current detection unit 52a is greater than or equal to a predetermined current value, the control circuit 53a turns off the FET 51a regardless of the supply instruction or the turn off instruction that is input from the microcomputer 14. At that time, the control circuit 53a outputs, to the microcomputer 14, an interruption signal indicating that the control circuit 53a has interrupted at its own discretion the electric current that flows through the wire 4a.

Furthermore, if a predetermined condition, for example, that the temperature detected by a not-shown temperature sensor for detecting the temperature in the vicinity of the wire 4a is less than a predetermined temperature is satisfied while the control circuit 53a interrupts at its own discretion the electric current that flows through the wire 4a, the control circuit 53a turns on/off the FET 51a in accordance with the supply instruction or the turn off instruction that is input from the microcomputer 14. At that time, the control circuit 53a outputs, to the microcomputer 14, a cancel signal indicating that the control circuit 53a has cancelled the interruption of the electric current that was made at its own discretion. Furthermore, also if the turn off instruction is input to the control circuit 53a from the microcomputer 14 while the control circuit 53a interrupts at its own discretion the electric current that flows through the wire 4a, the state in which the control circuit 53a has interrupted the electric current is cancelled.

The AD conversion circuit 12a converts the analog current value data input from the current detection unit 52a of the IPD 11a into digital current value data, and outputs the converted current value data to the microcomputer 14.

Note that the control device 1 may have a configuration in which the AD conversion circuit 12a is provided within the microcomputer 14. In this case, the AD conversion circuit 12a outputs the current value data to an input unit 61 of the microcomputer 14.

The IPD 11b has an N-channel-type FET 51b, a current detection unit 52b, and a control circuit 53b. The wire 4b, the FET 51b of the IPD 11b, the current detection unit 52b, the control circuit 53b, and the AD conversion circuit 12b are connected similar to the wire 4a, the FET 51a of the IPD 11a, the current detection unit 52a, the control circuit 53a, and the AD conversion circuit 12a.

The wire 4b, the FET 51b, the current detection unit 52b, the control circuit 53b, and the AD conversion circuit 12b respectively correspond to the wire 4a, the FET 51a, the current detection unit 52a, the control circuit 53a, and the AD conversion circuit 12a, and function similar to those. The current detection units 52a and 52b function as detection means Accordingly, the control circuit 53b switches on/off the FET 51b in accordance with the supply instruction or the turn off instruction with respect to the wire 4b that is input from the microcomputer 14, supplies/interrupts the electric current that flows through the wire 4b, and turns on/off the load 3b.

Furthermore, when the current value of the wire 4b that was detected by the current detection unit 52b is greater than or equal to a predetermined current value, the control circuit 53b turns off the FET 51b regardless of the supply instruction or the turn off instruction that is input from the microcomputer 14, and outputs an interruption signal for the wire 4b to the microcomputer 14.

Furthermore, if a predetermined condition is satisfied while the control circuit 53b interrupts at its own discretion the electric current that flows through the wire 4b, the control circuit 53b turns on/off the FET 51b in accordance with the supply instruction or the turn off instruction that is input from the microcomputer 14. At that time, the control circuit 53a outputs a cancel signal for the wire 4b to the microcomputer 14. Furthermore, also if the turn off instruction is input to the control circuit 53b from the microcomputer 14 while the control circuit 53b interrupts at its own discretion the electric current that flows through the wire 4b, the state in which the control circuit 53b has interrupted the electric current is cancelled.

Note that the control device 1 may have a configuration in which the AD conversion circuit 12b is provided within the microcomputer 14, similar to the case of the AD conversion circuit 12a. In this case, the AD conversion circuit 12b outputs the current value data to the input unit 61 of the microcomputer 14.

The temperature detection unit 13 detects the ambient temperature of the wires 4a and 4b, and outputs temperature data indicating the detected ambient temperature to the microcomputer 14. The temperature detection unit 13 detects the ambient temperature that is common to the wires 4a and 4b.

The microcomputer 14 has the input unit 61, an output unit 62, a storage unit 63, and a control unit 64. The control unit 64 is connected to the input unit 61, the output unit 62, and the storage unit 63 via a bus 65. The input unit 61 is further connected to the control circuit 53a of the IPD 11a, the AD conversion circuit 12a, the control circuit 53b of the IPD 11b, and the AD conversion circuit 12b. The output unit 62 is connected to the control circuit 53a of the IPD 11a, and the control circuit 53b of the IPD 11b.

A turn on/off instruction is input to the input unit 61 from the outside of the control device 1, and the input unit 61 notifies the control unit 64 of the content of the input turn on/off instruction. Furthermore, an interruption signal and a cancel signal are input to the input unit 61 from the control circuit 53a of the IPD 11a and the control circuit 53b of the IPD 11b.

Upon input of the interruption signal from the control circuit 53a (or the control circuit 53b), the input unit 61 notifies the control unit 64 of the fact that the control circuit 53a (or the control circuit 53b) has interrupted the electric current that flows through the wire 4a (or the wire 4b). Furthermore, upon input of the cancel signal from the control circuit 53a (or the control circuit 53b), the input unit 61 notifies the control unit 64 of the fact that the control circuit 53a (or the control circuit 53b) has cancelled the interruption of the electric current that was made at its own discretion.

Furthermore, pieces of digital current value data are input to the input unit 61 from the respective AD conversion circuits 12a and 12b, and the input unit 61 notifies the control unit 64 of the current values indicated by the input pieces of current value data.

Furthermore, temperature data is input to the input unit 61 from the temperature detection unit 13, and the input unit 61 notifies the control unit 64 of the ambient temperature of the wires 4a and 4b that is indicated by the input temperature data.

In accordance with the instruction of the control unit 64, the output unit 62 outputs a supply instruction or a turn off instruction for the wire 4a to the control circuit 53a of the IPD 11a, and outputs a supply instruction or a turn off instruction for the wire 4b to the control circuit 53b of the IPD 11b.

The storage unit 63 is a nonvolatile memory, and content stored in the storage unit 63 is read or written by the control unit 64.

The control device 1 takes on any one of the following five states.

A first state is a shutoff state in which the control device 1 is not supplied with power by a power supply that is not shown, and is shut off.

A second state is a load controlling state in which the control device 1 controls turning on/off the load 3a (or the load 3b) by supplying/interrupting the electric current that flows through the wire 4a (or the wire 4b) in accordance with the turn on/off instruction input from the outside.

A third state is a load interrupting state in which the electric current flowing through the wire 4a (or the wire 4b) is interrupted by the output unit 62 outputting a turn off instruction to the control circuit 53a (or the control circuit 53b) regardless of the turn on/off instruction input from the outside.

A forth state is a discretionarily interrupting state (self-interrupting state) in which the control circuit 53a of the IPD 11a (or the control circuit 53b of the IPD 11b) has interrupted at its own discretion the electric current that flows through the wire 4a (or the wire 4b).

A fifth state is a halting state in which the control unit 64 has halted its operation.

Except for the shutoff state and the halting state, the control device 1 may take on different states with respect to the wires 4a and 4b, namely, the load controlling state, the load interrupting state, or the discretionarily interrupting state. The control device 1 may take on, for example, the load controlling state for the wire 4a, and the load interrupting state for the wire 4b.

The control unit 64 is constituted by a calculation processing device such as a CPU (Central Processing Unit) or an MPU (Micro Processing Unit), and performs control processing, calculation processing, and the like by reading and executing a program stored in the storage unit 63.

The control unit 64 calculates a temperature difference between the temperature of the wire 4a and the ambient temperature of the wire 4a over time, using the ambient temperature and the current value of the wire 4a that are obtained from the input unit 61. Similarly, the control unit 64 calculates a temperature difference between the temperature of the wire 4b and the ambient temperature of the wire 4b over time, using the ambient temperature and the current value of the wire 4b that are obtained from the input unit 61. The control unit 64 functions as calculation means The control unit 64 stores the calculated temperature differences with respect to the wires 4a and 4b in the storage unit 63.

When the control device 1 is in the load controlling state or the load interrupting state, the control unit 64 calculates the temperature differences with respect to the wires 4a and 4b using Formulae (1) and (2) below.

$$\Delta T2 = \Delta T1 \times \exp(-\Delta t/\tau) + Rth \times R1 \times I1^2 \times (1 - \exp(-\Delta t/\tau)) \quad (1)$$

$$R1 = Ro \times (1 + \kappa \times (Ta + \Delta T1 - To)) \quad (2)$$

The following will describe the variables and the constants that are used in Formulae (1) and (2). In the description of the variables and the constants, the units of the variables or the constants are also indicated. $\Delta T1$ is a temperature difference (° C.) that was previously calculated, and $\Delta T2$ is a calculated temperature difference (° C.). At is an interval (s) for calculating the temperature difference $\Delta T2$, and $\tau$ is a heat radiation time constant (s) of the wire 4a (or the wire 4b).

Rth is a wire thermal resistance (° C./W) of the wire 4a (or the wire 4b), and R1 is a wire resistance ($\Omega$) of the wire 4a (or the wire 4b) when the temperature of the wire 4a (or the wire 4b) is the temperature of the wire 4a (or the wire 4b) that was previously calculated. To is a predetermined temperature (° C.), and Ro is a wire resistance ($\Omega$) at the temperature To. Ta is the ambient temperature (° C.) detected by the temperature detection unit 13, and $\kappa$ is the wire resistance temperature coefficient (/° C.) of the wire 4a (or the wire 4b). I1 is the current value (A) detected by the current detection unit 52a (or the current detection unit 52b). $\Delta T1$, $\Delta T2$, I1, and Ta are variables, and $\Delta t$, $\tau$, Rth, Ro, $\kappa$, and To are preset constants.

The control unit 64 calculates the wire resistance R1 by substituting the previously calculated temperature difference ΔT1 and the ambient temperature Ta obtained from the input unit 61 into Formula (2). Furthermore, the control unit 64 calculates the temperature difference by substituting the calculated wire resistance R1, the previously calculated temperature difference ΔT1, and the current value obtained from the input unit 61 into Formula (1). The control unit 64 calculates the respective temperatures of the wires 4a and 4b, by adding the respectively calculated temperature differences to the ambient temperature Ta obtained by the input unit 61.

Note that in the initial calculation of the temperature difference, the temperature difference, for example, zero that is stored in advance in the storage unit 63 is substituted into ΔT1. As will be described below, the control device 1 transitions from the shutoff state to the load controlling state, and from the halting state to the load controlling state. The above-described initial calculation of the temperature difference includes calculation of the temperature difference that is performed first after the control device 1 has transitioned from the shutoff state to the load controlling state, and calculation of the temperature difference that is performed first after the control device 1 has transitioned from the halting state to the load controlling state.

As described above, the control unit 64 calculates the temperature difference between the ambient temperature of the wire 4a (or the wire 4b) and the temperature of the wire 4a (or the wire 4b), using the current value detected by the current detection unit 52a (or the current detection unit 52b), and the previously calculated temperature difference. Therefore, the control unit 64 can easily and accurately calculate the temperature difference between the ambient temperature of the wire 4a (or the wire 4b) and the temperature of the wire 4a (or the wire 4b).

The right-hand side of Formula (1) is constituted by the sum of the first and second terms. Because $\exp(-\Delta t/\tau)$ decreases with an increase in the temperature difference calculation interval Δt, the first term is a term expressing the heat radiation of the wire 4a (or the wire 4b). Furthermore, because $(1-\exp(-\Delta t/\tau))$ increases with an increase in the temperature difference calculation interval Δt, the second term is a term expressing the heat generation of the wire 4a (or the wire 4b).

When the control device 1 is in the discretionarily interrupting state, the control unit 64 calculates the temperature differences with respect to the wires 4a and 4b using Formula (3) below.

$$\Delta T2=((Tth-Ta)/16)+\Delta T1 \quad (3)$$

Here, Tth is a threshold (° C.) that is for use in determining whether or not the electric current flowing through the wire 4a (or the wire 4b) is to be interrupted, and is, for example, 145° C.

When the control device 1 is in the shutoff state or the halting state, the control unit 64 does not calculate the temperature differences for the wires 4a and 4b.

The control unit 64 determines whether or not the temperatures calculated with respect to the wires 4a and 4b are greater than or equal to the predetermined threshold Tth, whether or not the IPD 11a (or the IPD 11b) is interrupting at its own discretion the electric current flowing through the wire 4a (or the wire 4b), whether or not the calculated temperature differences are smaller than a predetermined threshold ΔTth, and the like. The control unit 64 lets the output unit 62 output a supply instruction or a turn off instruction depending on the determination results.

The thresholds Tth and ΔTth are stored in advance in the storage unit 63. The threshold Tth corresponds to a first threshold, and the threshold ΔTth corresponds to a second threshold.

Furthermore, when the control device 1 is in the load controlling state or the load interrupting state, the control unit 64 measures, with respect to the wires 4a and 4b, a current-interrupted period in which an electric current is continuously interrupted, and the storage unit 63 stores a variable CNT and a constant value Cp for use in measuring the current-interrupted period.

The storage unit 63 also stores, for each of the wires 4a and 4b, a halt prohibition flag that indicates whether or not the halt of the temperature calculation is to be prohibited, and a variable T that indicates whether or not the turn on/off instruction that is input to the input unit 61 instructs the control device 1 to perform the turn-off when it is in the load interrupting state.

The halt prohibition flag set to 1 means that the calculation of the temperature of the wire 4a (or the wire 4b) should not be halted, and the halt prohibition flag set to zero means that the calculation of the temperature of the wire 4a (or the wire 4b) may be halted. Furthermore, the variable T set to zero means that the turn on/off instruction has not instructed the control device 1 to perform the turn-off with respect to the wire 4a (or the wire 4b) after the control device 1 transitioned to the load interrupting state, and the variable T set to 1 means that the turn on/off instruction has at least once instructed the control device 1 to perform the turn-off with respect to the wire 4a (or the wire 4b) after the control device 1 transitioned to the load interrupting state.

The control unit 64 also determines whether or not the current values of the respective wires 4a and 4b that are given by the input unit 61 are less than a predetermined threshold Ith, which is stored in the storage unit 63.

The following will describe the procedures of operations that are executed with respect to the wire 4a by the control unit 64 in the respective states of the control device 1. The procedures of operations that are executed with respect to the wire 4b by the control unit 64 in the respective states of the control device 1 are the same as those of the procedures of the operations with respect to the wire 4a that will be described below, and thus detailed descriptions thereof are omitted.

Figure 2:
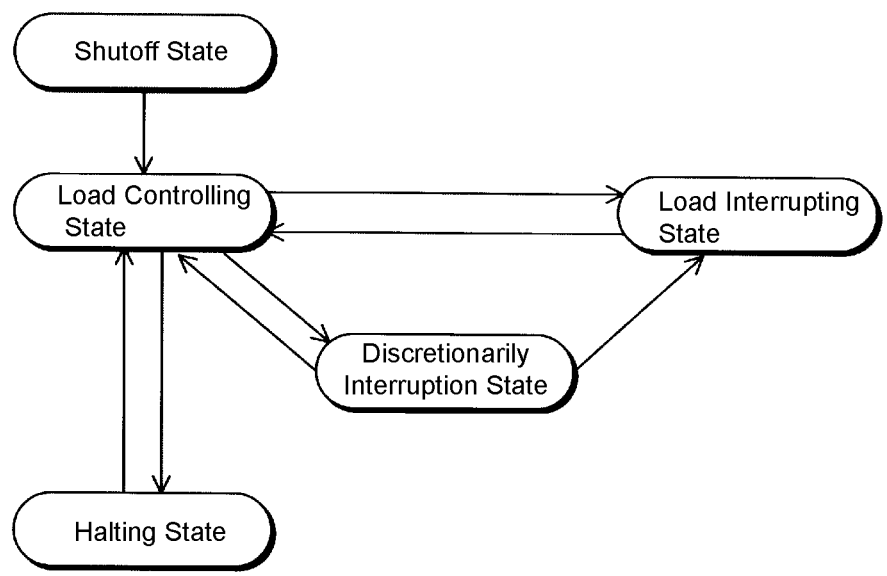
FIG. 2 is a state transition diagram of the control device.

FIG. 2 is a state transition diagram of the control device 1. When the control device 1 is in the shutoff state, the control unit 64 is shut off, and does not calculate the temperatures of the wires 4a and 4b. When the control device 1 that is in the shutoff state is powered on, the control unit 64 sets the variables CNT and T to zero, and sets the halt prohibition flag to zero. The state of the control device 1 transitions from the shutoff state to the load controlling state, and the control unit 64 advances the processing to processing of the load controlling state.

Figure 3:
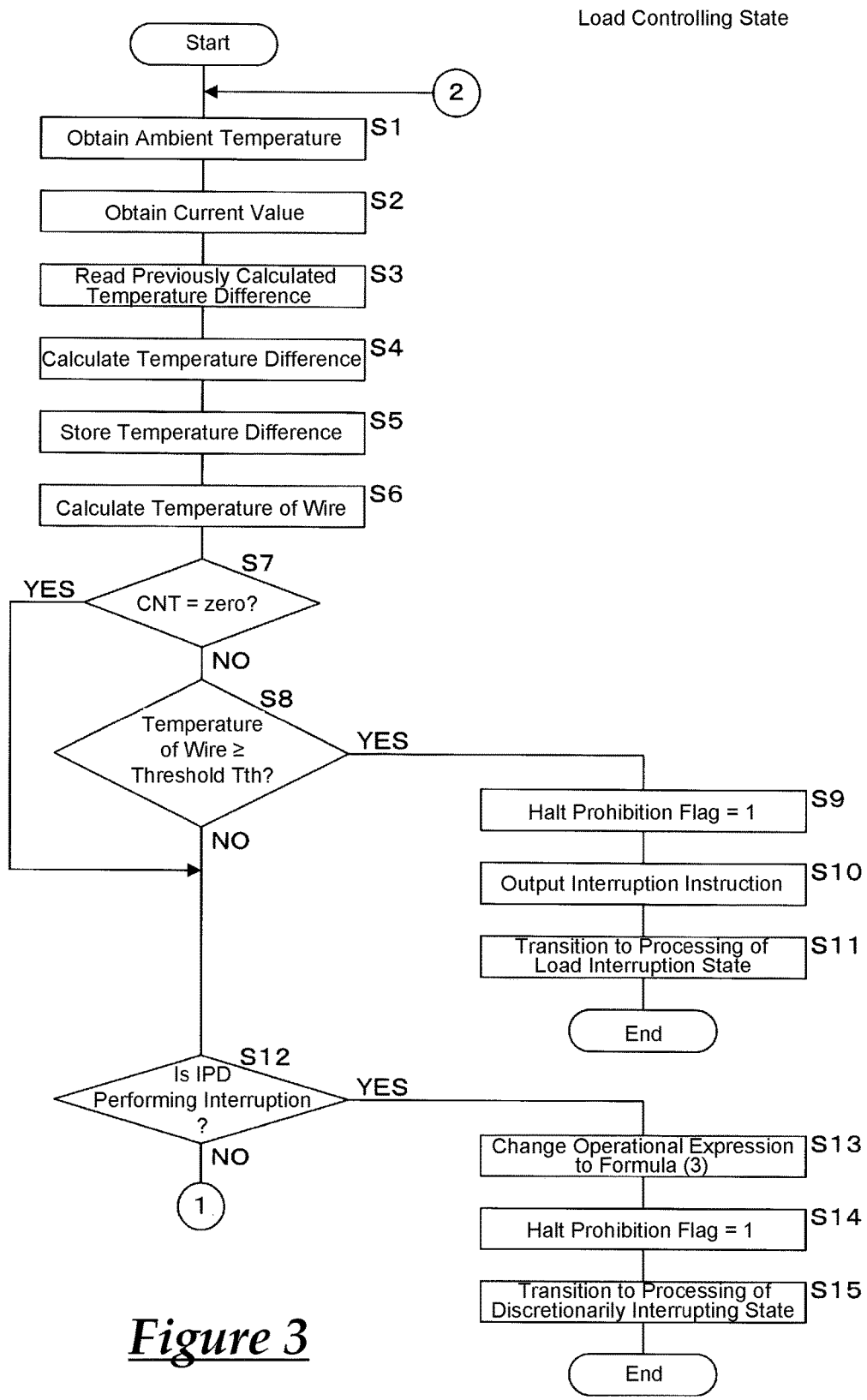
FIG. 3 is a flowchart illustrating the procedure of an operation that is executed by a control unit when the control device is in a load controlling state.
Figure 4:
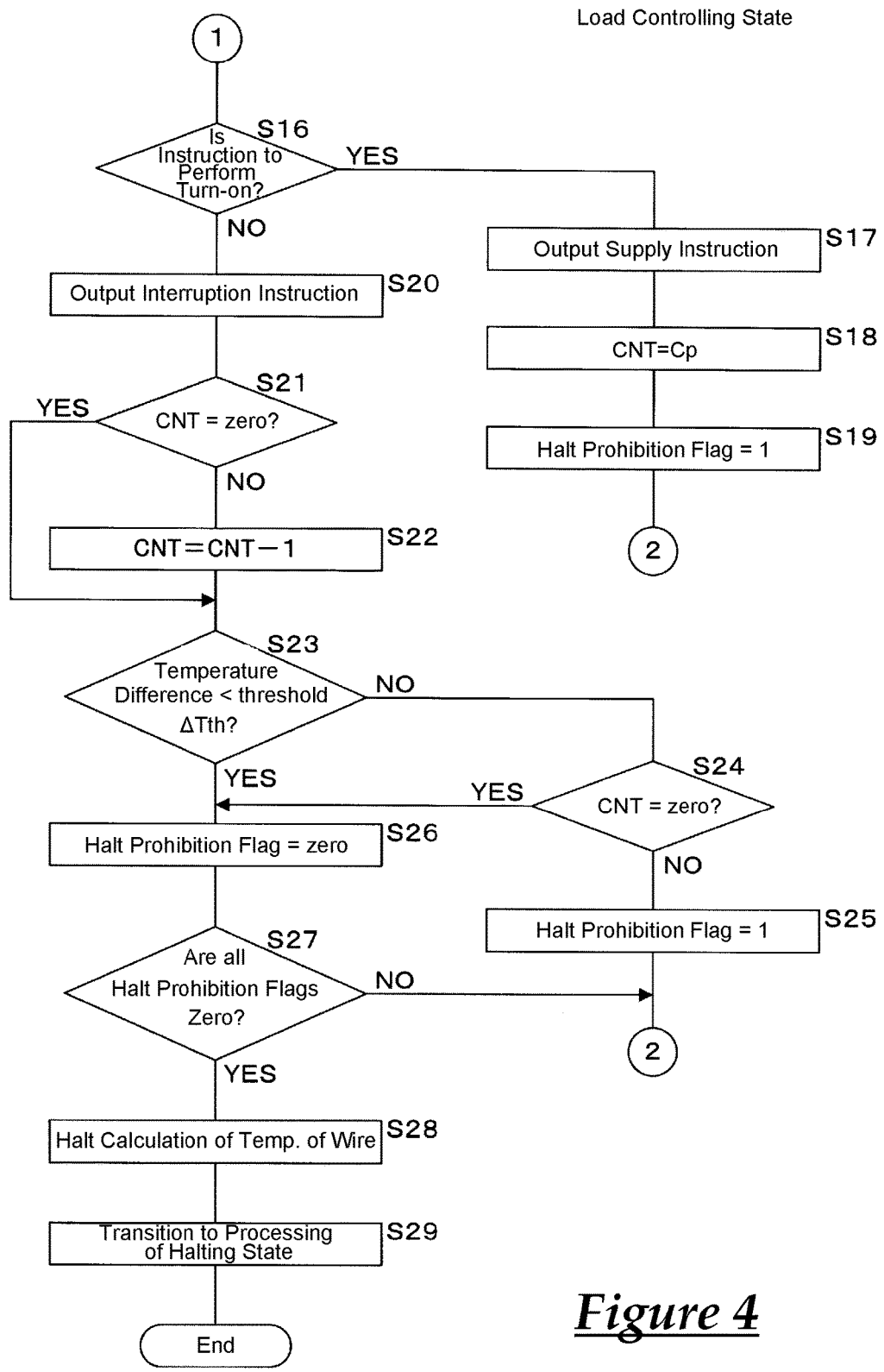
FIG. 4 is a flowchart illustrating the procedure of the operation that is executed by the control unit when the control device is in the load controlling state.

FIGS. 3 and 4 are flowcharts illustrating the procedure of the operation that is executed by the control unit 64 when the control device 1 is in the load controlling state. The control unit 64 first obtains the ambient temperature detected by the temperature detection unit 13 from the input unit 61 (step S1), obtains the current value detected by the current detection unit 52a from the input unit 61 (step S2), and reads the previously calculated temperature difference from the storage unit 63 (step S3). Here, when step S3 is executed for the first time after the control device 1 has transitioned from the shutoff state or the halting state to the load controlling state, the value of the first temperature difference ΔT1 stored in advance in the storage unit 63 is read.

Then, the control unit 64 calculates the temperature difference between the temperature of the wire 4a and the ambient temperature of the wire 4a by substituting the ambient temperature and the current value that were obtained in steps S1 and S2 and the temperature difference read in step S3 into Formulae (1) and (2) (step S4). The control unit 64 stores the temperature difference calculated in step S4 in the storage unit 63 (step S5), and calculates the temperature sum of the ambient temperature obtained in step S1 and the temperature difference calculated in step S4, that is, the temperature sum serving as the temperature of the wire 4a (step S6).

After the execution of step S6, the control unit 64 determines whether or not the variable CNT stored in the storage unit 63 is zero (step S7). If it is determined that the variable CNT is not zero (NO in step S7), the control unit 64 determines whether or not the temperature of the wire 4a that was calculated in step S6 is greater than or equal to the threshold Tth (step S8).

If it is determined that the temperature of the wire 4a is greater than or equal to the threshold Tth, for example, 145° C. (YES in step S8), the control unit 64 sets the halt prohibition flag to 1 (step S9), and instructs the output unit 62 to output a turn off instruction to the control circuit 53a of the IPD 11a (step S10). Accordingly, the control circuit 53a turns off the FET 51a, and the electric current flowing through the wire 4a is interrupted.

As described above, if the temperature of the wire 4a calculated in step S6 is greater than or equal to the threshold Tth, the control unit 64 outputs the turn off instruction to the control circuit 53a thereby interrupting the electric current flowing through the wire 4a.

Accordingly, the state of the control device 1 transitions from the load controlling state to the load interrupting state, as shown in FIG. 2.

After the execution of step S10, the control unit 64 advances the processing to processing of the load interrupting state (step S11), and ends the processing performed when the control device 1 is in the load controlling state.

If it is determined that the variable CNT is zero (YES in step S7), or the temperature of the wire 4a is less than the threshold Tth (NO in step S8), the control unit 64 determines whether or not the IPD 11a is interrupting at its own discretion the electric current flowing through the wire 4a (step S12). Here, the control unit 64 determines that the IPD 11a is performing the interruption if an interruption signal is input from the control circuit 53a of the IPD 11a to the input unit 61, and determines that the IPD 11a is not performing the interruption if no interruption signal is input from the control circuit 53a to the input unit 61.

If the IPD 11a interrupts at its own discretion the electric current flowing through the wire 4a, the state of the control device 1 transitions from the load controlling state to the discretionarily interrupting state, as shown in FIG. 2.

Note that the determination of whether or not the IPD 11a is performing the interruption at its own discretion may not necessarily be made based on whether or not an interruption signal has been input to the input unit 61. For example, after having instructed the output unit 62 to output a supply instruction, the control unit 64 may obtain the value of the electric current flowing through the wire 4a from the input unit 61, and may determine whether or not the IPD 11a is performing the interruption based on whether or not the obtained current value is zero. In this case, the control unit 64 determines that the IPD 11a is performing the interruption if the current value obtained from the input unit 61 is zero, and determines that the IPD 11a is not performing the interruption if the current value obtained from the input unit 61 is not zero.

If it is determined that the IPD 11a is performing the interruption (YES in step S12), the control unit 64 changes the operational expression for use in calculation of the temperature difference from formulae (1) and (2) to Formula (3) (step S13), and sets the halt prohibition flag to 1 (step S14). At this time, the state of the control device 1 has transitioned from the load controlling state to the discretionarily interrupting state, as shown in FIG. 2. After the execution of step S14, the control unit 64 advances the processing to processing of the discretionarily interrupting state (step S15), and ends the processing performed when the control device 1 is in the load controlling state.

If it is determined that the IPD 11a is not performing the interruption (NO in step S12), the control unit 64 determines whether or not the turn on/off instruction input to the input unit 61 is to perform the turn-on with respect to the wire 4a (step S16). If it is determined that the turn on/off instruction is to perform the turn-on (YES in step S16), the control unit 64 instructs the output unit 62 to output a supply instruction to the control circuit 53a of the IPD 11a (step S17). Accordingly, the control circuit 53a turns on the FET 51a, and supplies an electric current that flows through the wire 4a.

Then, the control unit 64 sets the variable CNT to the constant Cp, for example, 12000 (step S18), and sets the halt prohibition flag to 1 (step S19). After the execution of step S19, the control unit 64 returns the procedure to step 51, and calculates again the temperature of the wire 4a.

If the turn on/off instruction is not to perform the turn-on, that is, to perform the turn-off (NO in step S16), the control unit 64 instructs the output unit 62 to output a turn off instruction to the control circuit 53a of the IPD 11a (step S20). Accordingly, the control circuit 53a turns off the FET 51a, and interrupts the electric current flowing through the wire 4a.

Then, the control unit 64 determines whether or not the variable CNT is zero (step S21). If it is determined that the variable CNT is not zero (NO in step S21), the control unit 64 decrements the variable CNT by 1 (step S22). If it is determined that variable CNT is zero (YES in step S21), or after the execution of step S22, the control unit 64 determines whether or not the temperature difference calculated in step S4 is less than the threshold ΔTth, for example, 5° C. (step S23).

If it is determined that the temperature difference is greater than or equal to the threshold ΔTth (NO in step S23), the control unit 64 determines whether or not the variable CNT is zero (step S24). If it is determined that the variable CNT is not zero (NO in step S24), the control unit 64 sets the halt prohibition flag to 1 (step S25), returns the procedure to step 51, and calculates again the temperature of the wire 4a.

While the turn on/off instruction is to perform the turn-off with respect to the wire 4a and the output unit 62 is instructed to output a turn off instruction, the control unit 64 periodically repeats the calculation of the temperature of the wire 4a and continues to decrement the variable CNT by 1 until the temperature difference calculated in step S4 becomes less than the threshold ΔTth or the variable CNT becomes zero. In this manner, the control unit 64 measures a time period in which the electric current flowing through the wire 4a is being interrupted by decrementing the variable CNT by 1. Also with respect to the wire 4b, the control unit 64 measure a time period in which the electric current flowing through the wire 4b is being interrupted, thus functioning also as time measuring means.

If it is determined that the temperature difference is less than the threshold ΔTth (YES in step S23), or that the variable CNT is zero (YES in step S24), the control unit 64 sets the halt prohibition flag to zero (step S26). Then, the control unit 64 determines whether or not all the halt prohibition flags stored in the storage unit 63, that is, the halt prohibition flags of the wires 4a and 4b are zero (step S27). If it is determined that not all the halt prohibition flags are zero, that is, the halt prohibition flag of the wire 4b is 1 (NO in step S27), the control unit 64 returns the procedure to step 51, and calculates again the temperature of the wire 4a.

If it is determined that all the halt prohibition flags are zero (YES in step S27), the control unit 64 halts the calculation of the temperatures of the wires 4a and 4b (step S28). Accordingly, the control device 1 transitions from the load controlling state to the halting state, as shown in FIG. 2. The control unit 64 functions also as halting means After the execution of step S28, the control unit 64 advances the processing to processing of the halting state (step S29), and ends the processing performed when the control device 1 is in the load controlling state.

In the processing of the control unit 64 when the control device 1 is in the load controlling state, the halt prohibition flag becomes zero when the temperature difference between the temperature of the wire 4a and the ambient temperature of the wire 4a is less than the threshold ΔTth, or when the variable CNT is zero. As described above, also with respect to the wire 4b, the control unit 64 performs the same processing and thus the halt prohibition flag becomes zero when the temperature difference between the temperature of the wire 4b and the ambient temperature of the wire 4b is less than the threshold ΔTth, or when the variable CNT is zero. Furthermore, if both the halt prohibition flags of the wires 4a and 4b are zero, the calculation of the temperatures of the wires 4a and 4b is halted.

Accordingly, the control unit 64 halts the calculation of the temperature difference with respect to the wires 4a and 4b, if the calculated temperature difference is less than the threshold ΔTth, or the time period in which the electric current is being interrupted exceeds the predetermined time period. The control unit 64 functions also as halting means.

Figure 5:
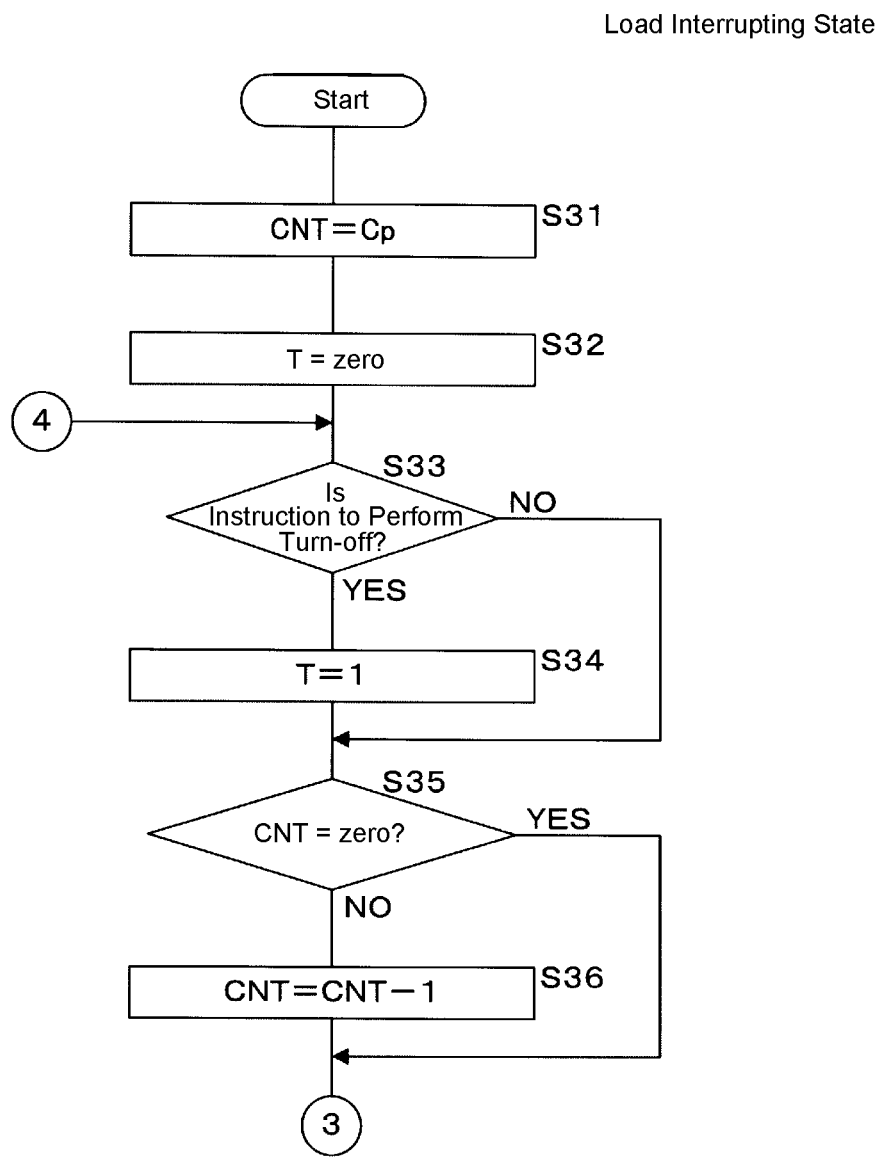
FIG. 5 is a flowchart illustrating the procedure of an operation that is executed by the control unit when the control device is in a load interrupting state.
Figure 6:
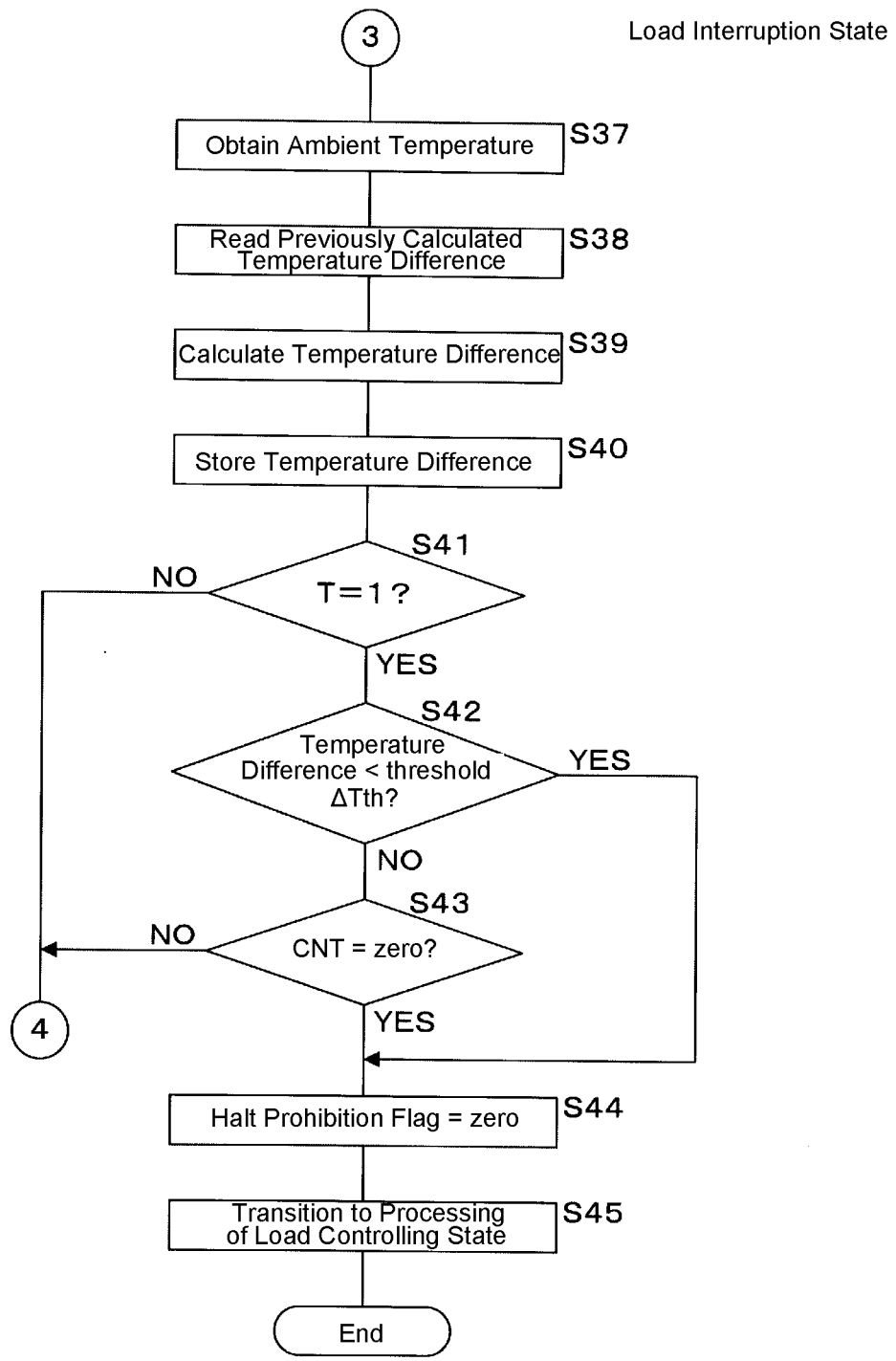
FIG. 6 is a flowchart illustrating the procedure of the operation that is executed by the control unit when the control device is in the load interrupting state.

FIGS. 5 and 6 are flowcharts illustrating the procedure of the operation that is executed by the control unit 64 when the control device 1 is in the load interrupting state. When the processing of the control unit 64 advances to the processing of the load interrupting state, the turn off instruction has been output from the output unit 62 to the control circuit 53a, and the electric current of the wire 4a has been interrupted. While the control device 1 is in the load interrupting state, the state remains in which the turn off instruction has been output from the output unit 62 to the control circuit 53.

First, the control unit 64 sets the variable CNT to the constant Cp in order to measure the time period in which the electric current flowing through the wire 4a is being interrupted (step S31), and sets the variable T to zero (step S32). Then, the control unit 64 determines whether or not the turn on/off instruction input to the input unit 61 is to perform the turn-off with respect to the wire 4a (step S33). If it is determined that the instruction is to perform the turn-off (YES in step S33), the control unit 64 determines that the turn on/off instruction has at least once instructed the control device 1 to perform the turn-off with respect to the wire 4a after the control device 1 transitioned to the load interrupting state, and sets the variable T to 1 (step S34).

If it is determined that the instruction is not to perform the turn-off (NO in step S33), or after the execution of step S34, the control unit 64 determines whether or not the variable CNT is zero (step S35). If it is determined that the variable CNT is not zero (NO in step S35), the control unit 64 decrements the variable CNT by 1 (step S36).

If it is determined that the variable CNT is zero (YES in step S35), or after the execution of step S36, the control unit 64 obtains the ambient temperature detected by the temperature detection unit 13 from the input unit 61 (step S37), and reads a previously calculated temperature difference from the storage unit 63 (step S38). Here, the temperature difference that is read from the storage unit 63 is not limited to the temperature difference that is calculated when the control device 1 is in the load interrupting state, and the control unit 64 may read the temperature difference that is calculated when the control device 1 is in, for example, the load controlling state.

Then, the control unit 64 calculates the temperature difference between the temperature of the wire 4a and the ambient temperature of the wire 4a by substituting the ambient temperature obtained in step S37 and the temperature difference read in step S38 into Formulae (1) and (2) (step S39). When the control device 1 is in the load interrupting state, the electric current flowing through the wire 4a is interrupted, and thus the value of the electric current flowing through the wire 4a is zero. Accordingly, in step S39, the control unit 64 substitutes zero into I1 of Formula (1). Accordingly, since the right-hand side of Formula (1) is expressed only by the term expressing the heat radiation of the wire 4a, the temperature of the wire 4a that is calculated in step S37 is lower than the temperature of the previously calculated wire 4a.

Then, the control unit 64 stores the temperature difference calculated in step S39 in the storage unit 63 (step S40), and determines whether or not the variable T is 1, that is, whether or not the turn on/off instruction input to the input unit 61 has at least once instructed the control device 1 to perform the turn-off with respect to the wire 4a after the control device 1 transitioned to the load interrupting state (step S41). If it is determined that the variable T is not 1, that is, the variable T is zero (NO in step S41), the control unit 64 returns the procedure to step S33, and periodically repeats the calculation of the temperature difference until the turn on/off instruction is to perform the turn-off with respect to the wire 4a.

If it is determined that the variable T is 1 (YES in step S41), the control unit 64 determines whether or not the temperature difference calculated in step S39 is less than the threshold ΔTth (step S42). If it is determined that the temperature difference is greater than or equal to the threshold ΔTth (NO in step S42), the control unit 64 determines whether or not the variable CNT is zero (step S43). If it is determined that the variable CNT is not zero (NO in step S43), the control unit 64 returns the procedure to step S33, and periodically repeats the calculation of the temperature difference until the temperature difference calculated in step S39 becomes less than the threshold ΔTt or the variable CNT becomes zero.

The control unit 64 periodically repeats the calculation of the temperature of the wire 4a and continues to decrement the variable CNT by 1, until the variable T becomes 1, and the temperature difference calculated in step S39 becomes less than the threshold ΔTth or the variable CNT becomes zero. Accordingly, the control unit 64 measures a time period in which the electric current flowing through the wire 4a is being interrupted by decrementing the variable CNT by 1.

Also with respect to the wire 4b, the control unit 64 measures a time period in which the electric current flowing through the wire 4b is being interrupted. The control unit 64 measures the time periods in which electric currents flowing through the wires 4a and 4b are interrupted when the control device 1 is not only in the load controlling state but also in the load interrupting state.

If it is determined that the temperature difference is less than the threshold ΔTth (YES in step S42), or the variable CNT is zero (YES in step S43), the control unit 64 sets the halt prohibition flag to zero (step S44). Accordingly, the control unit 64 advances the processing to the processing of the load controlling state (step S45), and ends the processing performed when the control device 1 is in the load interrupting state. Then, as described above, the control unit 64 outputs to the output unit 62 the supply instruction or the turn off instruction depending on whether the turn on/off instruction is to perform the turn-on or to perform the turn-off with respect to the wire 4a, and supplies/interrupts the electric current flowing through the wire 4a. The state of the control device 1 transitions from the load interrupting state to the load controlling state, as shown in FIG. 2.

In the processing of the control unit 64 when the control device 1 is in the load interrupting state, the halt prohibition flag becomes zero when the temperature difference between the temperature of the wire 4a and the ambient temperature of the wire 4a is less than the threshold ΔTth, or when the variable CNT is zero, and the processing advances to the processing of the load controlling state. When the control unit 64 advances the processing to the processing of the load controlling state, and the turn on/off instruction input to the input unit 61 is to perform the turn-off with respect to the wire 4a, the temperature calculated in step S4 is less than the threshold ΔTth, or the variable CNT is zero. At this time, if the halt prohibition flag of the wire 4b is zero, the control unit 64 halts the calculation of the temperatures of the wires 4a and 4b.

Figure 7:
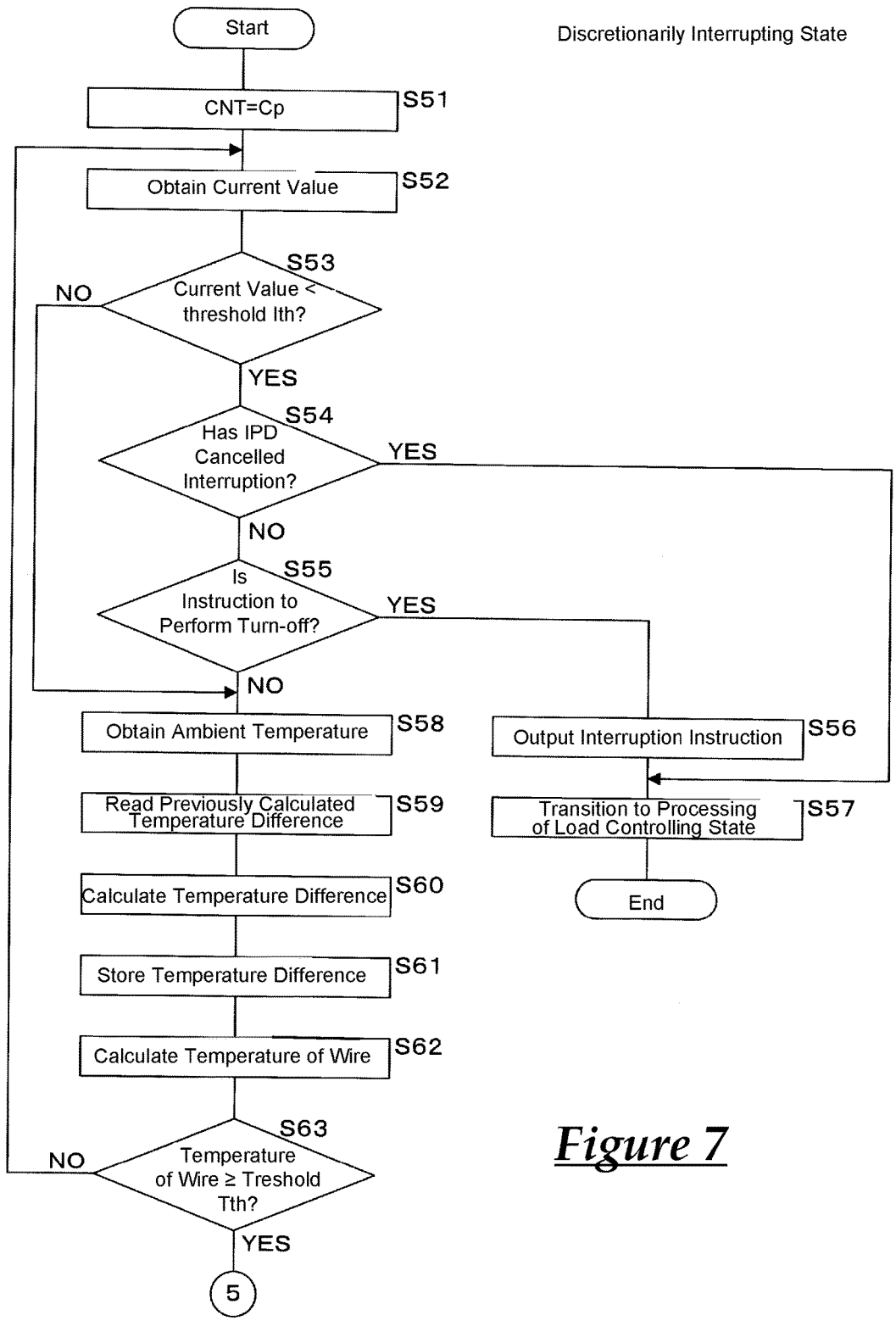
FIG. 7 is a flowchart illustrating the procedure of an operation that is executed by the control unit when the control device is in a discretionarily interrupting (self-interrupting) state.
Figure 8:
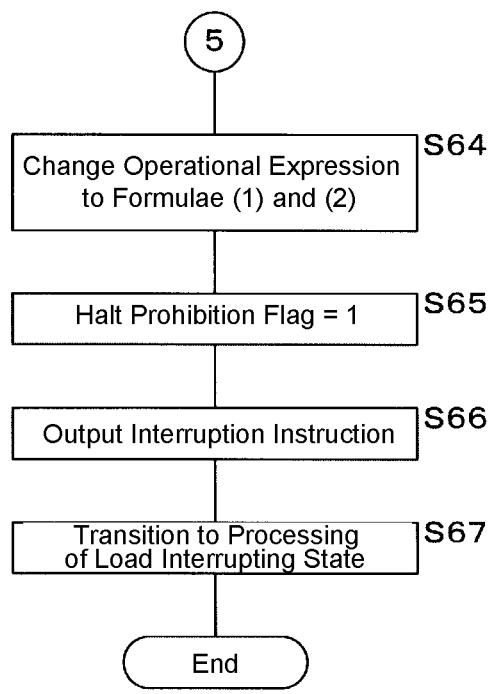
FIG. 8 is a flowchart illustrating a procedure of the operation that is executed by the control unit when the control device is in the discretionarily interrupting state.

FIGS. 7 and 8 are flowcharts illustrating the procedure of the operation that is executed by the control unit 64 when the control device 1 is in the discretionarily interrupting state. When the procedure of the control unit 64 has transitioned to the processing of the discretionarily interrupting state, the operational expression for calculating the temperature difference between the temperature of the wire 4a and the ambient temperature of the wire 4a has been changed to Formula (3).

First, the control unit 64 sets the variable CNT to the constant Cp (step S51). In the processing from step S51 onward, the control unit 64 does not change the value of the variable CNT and the value of the variable CNT remains as the constant Cp.

After the execution of step S51, the control unit 64 obtains the current value detected by the current detection unit 52a from the input unit 61 (step S52), and determines whether or not the obtained current value is less than the threshold Ith (step S53). If the current value is less than the threshold Ith (YES in step S53), the control unit 64 determines whether or not the IPD 11a has cancelled the interruption of the electric current flowing through the wire 4a (step S54). Here, the control unit 64 determines that the IPD 11a has cancelled the interruption if a cancel signal is input to the input unit 61 from the control circuit 53a of the IPD 11a, and determines that the IPD 11a has not cancelled the interruption if no cancel signal is input to the input unit 61 from the control circuit 53a.

If it is determined that the IPD 11a has not cancelled the interruption (NO in step S54), the control unit 64 determines that the turn on/off instruction input to the input unit 61 is to perform the turn-off with respect to the wire 4a (step S55). If it is determined that the instruction is to perform the turn-off (YES in step S55), the control unit 64 instructs the output unit 62 to output a turn off instruction to the control circuit 53a of the IPD 11a (step S56). If it is determined that the IPD 11a has cancelled the interruption (YES in step S54), or after the execution of step S56, the control unit 64 advances the processing to the processing of the load controlling state (step S57), and ends the processing performed when the control device 1 is in the discretionarily interrupting state. The state of the control device 1 transitions from the discretionarily interrupting state to the load controlling state, as shown in FIG. 2.

If it is determined that the current value is greater than or equal to the threshold Ith (NO in step S53), or if it is determined that the instruction is not to perform the interruption (NO in step S55), the control unit 64 obtains the ambient temperature detected by the temperature detection unit 13 from the input unit 61 (step S58), and reads a previously calculated temperature difference from the storage unit 63 (step S59). Here, similar to the case of step S38, the temperature difference that is read from the storage unit 63 is not limited to the temperature difference calculated when the control device 1 is in the discretionarily interrupting state.

Then, the control unit 64 calculates the temperature difference between the temperature of the wire 4a and the ambient temperature of the wire 4a by substituting the ambient temperature obtained in step S58 and the temperature difference read in step S59 into Formula (3) (step S60), and stores the calculated temperature difference in the storage unit 63 (step S61). After the execution of step S61, the control unit 64 calculates the temperature sum of the ambient temperature obtained in step S58 and the temperature difference calculated in step S60, that is, the temperature sum serving as the temperature of the wire 4a (step S62).

Then, the control unit 64 determines whether or not the temperature of the wire 4a calculated in step S62 is greater than or equal to the threshold Tth (step S63). If it is determined that the temperature of the wire 4a is less than the threshold Tth (NO in step S63), the control unit 64 returns the procedure to step S52. The control unit 64 periodically repeats the calculation of the temperature of the wire 4a while the calculated temperature of the wire 4a is less than the threshold Tth, if the IPD 11a has not canceled the interruption of the electric current and the turn on/off instruction is to perform the turn-on with respect to the wire 4a. In Formula (3), the temperature difference ΔT2 is calculated by adding (Tth−Ta)/16 to the previously calculated temperature difference ΔT1. Accordingly, after the calculation of step S62 is repeated at least sixteen times, the temperature difference between the temperature of the wire 4a and the ambient temperature of the wire 4a is greater than or equal to Tth−Ta, and the temperature of the wire 4a obtained by adding the ambient temperature Ta to this temperature difference is greater than or equal to the threshold Tth.

If it is determined that the temperature of the wire 4a is greater than or equal to the threshold Tth (YES in step S63), the control unit 64 changes the operational expression for use in calculating the temperature difference from Formula (3) to Formulae (1) and (2) (step S64), and sets the halt prohibition flag to 1 (step S65). Then, the control unit 64 instructs the output unit 62 to output the turn off instruction to the control circuit 53a of the IPD 11a (step S66), and advances the processing to the processing of the load interrupting state (step S67), and ends the processing performed when the control device 1 is in the discretionarily interrupting state. The state of the control device 1 transitions from the discretionarily interrupting state to the load interrupting state, as shown in FIG. 2.

When the control device 1 is in the halting state, the turn on/off instructions that are input to the input unit 61 are to perform the turn-off with respect to the wires 4a and 4b, and the control unit 64 halts the calculation of the temperatures of the wires 4a and 4b. Therefore, low power consumption is realized in the control device 1. When the turn on/off instruction input to the input unit 61 is to perform the turn-on of the load 3a or the load 3b, the control unit 64 sets the variable CNT to zero, then advances the processing to the processing of the load controlling state, and starts again the calculation of the temperatures of the wires 4a and 4b.

As described above, the procedures of the operations that are executed by the control unit 64 with respect to the wire 4b when the control device 1 is in the respective states are the same as the procedures of the operations with respect to the wire 4a as described below. The wire 4a, the IPD 11a, the AD conversion circuit 12a, the FET 51a, the control circuit 53a, and the current detection unit 52a respectively correspond to the wire 4b, the IPD 11b, the AD conversion circuit 12b, the FET 51b, the control circuit 53b, and the current detection unit 52b. Furthermore, in the description of the wire 4b, the wire 4b that is used in the description of the wire 4a is replaced by the wire 4a.

In the control device 1 having the above-described configuration, for both the wires 4a and 4b, the halt prohibition flag is zero if the calculated temperature difference is less than the threshold ΔTth or the variable CNT is zero, and the calculation of the temperature difference is halted if both the halt prohibition flags for the wires 4a and 4b are zero.

Therefore, even if the control unit 64 erroneously calculates a temperature difference due to a bug of a program for calculating the temperatures of the wires 4a and 4b, malfunction of a calculation unit of the control unit 64 for calculating the temperature difference, or the like, and the calculated temperature difference is less than the threshold ΔTth, it is possible to halt the calculation of the temperature difference. And even if the control unit 64 erroneously calculates a temperature difference, the calculation of the temperatures of the wires 4a and 4b is halted when the variable CNT is zero, making it possible to realize low power consumption.

Therefore, when the control device 1 is powered by the battery 2, the control unit 64 halts the calculation of the temperatures of the respective wires 4a and 4b even if the control unit 64 continues to erroneously calculate a temperature difference as described above, making it possible to prevent the draining of the battery.

Note that the configuration in which the control unit 64 calculates the temperature of the wire 4a is not limited to a configuration in which the calculation is made using a previously calculated temperature difference and the value of the electric current flowing through the wire 4a, and any configuration may be used as long as the temperature difference between the ambient temperature of the wire 4a and the temperature of the wire 4a is calculated over time. The configuration in which the control unit 64 calculates the temperature of the wire 4b is also not limited to the configuration in which the calculation is made using a previously calculated temperature difference and the value of the electric current flowing through the wire 4b.

Furthermore, the configuration in which the control unit 64 measures the time period in which the electric currents of the wires 4a and 4b are being interrupted is not limited to the configuration in which the variable CNT is decremented by 1 from the constant Cp. A configuration is also possible in which the control unit 64 increments the variable CNT by 1 from zero. Furthermore, the control device 1 may include a timer, and the control unit 64 may use the timer to measure the time period in which an electric current is being interrupted.

Furthermore, the number of the wires that are used by the control device 1 to supply/interrupt an electric current is not limited to two, and may be one, or three or more. In the case where there is only the wire 4a for use in supplying/interrupting an electric current, the control unit 64 executes, after step S26, step S28 when the control device 1 is in the load controlling state. If the calculated temperature difference with respect to the wire 4a is less than the threshold ΔTth or the variable CNT is zero, the halt prohibition flag will become zero, and thereby the control unit 64 will halt the calculation of the temperature of the wire 4a.

Even in this case, it is possible to halt the calculation of the temperature difference, if a temperature difference is erroneously calculated due to a bug of a program for calculating the temperature of the wire 4a, malfunction of a calculation unit of the control unit 64 for calculating the temperature difference, or the like, and the calculated temperature difference is not less than the threshold ΔTth. Even if the control unit 64 erroneously calculates a temperature difference, the calculation of the temperature of the wire 4a will be halted if the variable CNT is zero, realizing low power consumption.

In the case where the number of the wires for use in supplying/interrupting an electric current is three or more, the control unit 64 performs, for each wire, the same processing as that performed with respect to the wire 4a, and halts the calculation of the temperatures of all the wires when the halt prohibition flags of all the wires are zero.

Furthermore, since the FETs 51a and 51b need only to function as a switch, the FETs 51a and 51b are not limited to an N-channel-type FET, and may be a P-channel-type FET, a bipolar transistor, or the like.

The disclosed embodiments are to be construed as not limitative but illustrative in all respects. The scope of the present invention is defined by the claims rather than the description above, and is intended to include any modifications within the scope and meaning equivalent to the claims

LIST OF REFERENCE NUMERALS

1 Control device
4a, 4b Wire
52a, 52b Current detection unit (detection means)
64 Control unit (calculation means, time measuring means, halting means)

The invention claimed is:

1. A control device comprising:
calculation means for calculating, over time, a temperature difference between an ambient temperature of a wire and a temperature of the wire, the control device being for supplying/interrupting an electric current that flows through the wire, and the control device being configured for interrupting the electric current if a temperature sum of the temperature difference calculated by the calculation means and the ambient temperature is greater than or equal to a first threshold, the control device further comprising:
time measuring means for measuring a time period in which the electric current is being interrupted; and halting means for halting the calculation of the calculation means if the temperature difference calculated by the calculation means is less than a second threshold, or if the time period measured by the time measuring means exceeds a predetermined time period.

2. The control device according to the claim 1, further comprising:
detection means for detecting the electric current flowing through the wire,
wherein the calculation means is configured to calculate the temperature difference using a value of the electric current detected by the detection means and a previously calculated temperature difference.

3. A control device comprising:
calculation means for calculating over time, for each of a plurality of wires, a temperature difference between an ambient temperature of the wire and a temperature of the wire, the control device being for supplying/interrupting an electric current that flows through each of the plurality of wires, and the control device being configured for interrupting, if a temperature sum of the temperature difference calculated by the calculation means and the ambient temperature is greater than or equal to a first threshold, the electric current flowing through that wire of the plurality of wires where the temperature sum is greater than or equal to the first threshold, the control device further comprising:
time measuring means for measuring, for each of the plurality of wires, a time period in which an electric current flowing through the wire is being interrupted; and
halting means for halting the calculation by the calculation means if, for each of the plurality of wires, the temperature difference calculated by the calculation means is less than a second threshold or the time period measured by the time measuring means exceeds a predetermined time period.

\* \* \* \* \*